No. 679,365. Patented July 30, 1901.
R. R. DARLING.
POWER TRANSMITTING MECHANISM.
(Application filed Jan. 6, 1900.)
(No Model.)
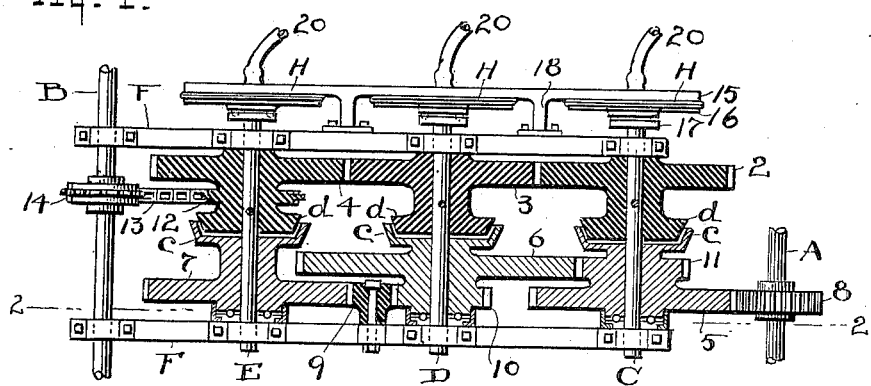
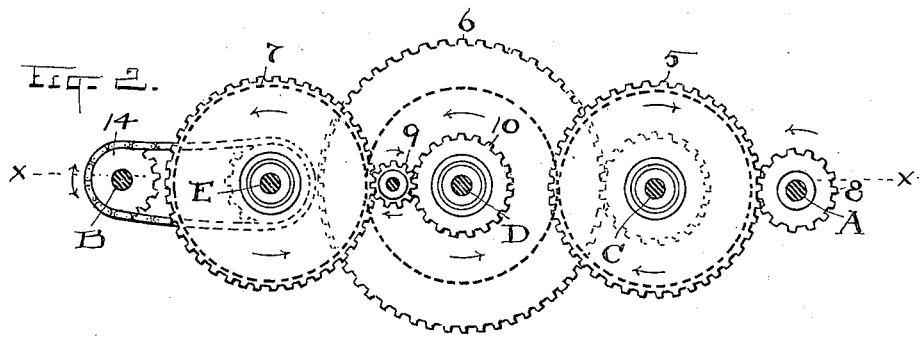
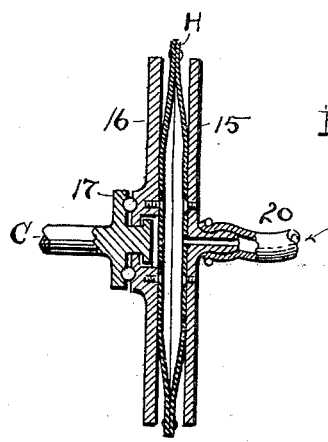
ATTEST
INVENTOR.

UNITED STATES PATENT OFFICE.

ROLLA R. DARLING, OF CLEVELAND, OHIO, ASSIGNOR TO THE BEARDSLEY & HUBBS MANUFACTURING COMPANY, OF MANSFIELD, OHIO.

POWER-TRANSMITTING MECHANISM.

SPECIFICATION forming part of Letters Patent No. 679,365, dated July 30, 1901.

Application filed January 6, 1900. Serial No. 569. (No model.)

*To all whom it may concern:*

Be it known that I, ROLLA R. DARLING, a citizen of the United States, residing at Cleveland, in the county of Cuyahoga and State of Ohio, have invented certain new and useful Improvements in Power-Transmitting Mechanism; and I do declare that the following is a full, clear, and exact description of the invention, which will enable others skilled in the art to which it appertains to make and use the same.

My invention relates to power-transmitting mechanism for motor-vehicles; and the object of the invention is to provide a mechanism for this purpose which will afford variable speed and reversal of movement at the will of the operator, all as hereinafter fully described, and particularly pointed out in the claims.

In the accompanying drawings, Figure 1 is a sectional plan view of the invention on line $x\,x$, Fig. 2. Fig. 2 is an elevation thereof on line 2 2, Fig. 1, the near portion of the carrying-frame being removed. Fig. 3 is a vertical section of one of the bellows or inflatable devices for adjusting the shafts axially, as hereinafter fully described.

In the organization here shown, A represents the engine driven or power-shaft proper, and B the driven shaft or axle, presumably, but not necessarily, a vehicle-axle.

C, D, and E are three successive gear-carrying shafts supported in a suitable framework F and mounting what are practically two separate and distinct lines of power-transmitting mechanism. Thus 2, 3, and 4 constitute what may be considered as one line and 5, 6, and 7 the other line. The first-named line may also be treated as the direct or forward line and 5, 6, and 7 as the indirect or reverse line. Intermediate of these two lines of gears and involving parts of both, or both in part, are the speed-varying combinations hereinbefore referred to. Then, as a further sameness of organization and relation the gears 2, 3, and 4 are each fixed permanently on its shaft, while the gears 5, 6, and 7 are free or loose thereon, and similar friction engagement between said fixed and loose gears on each shaft successively is also provided for. In this instance the means employed consists in a friction-cup $c$ on the hub of each loose gear and a friction-disk $d$ on each fixed gear 2 3 4, or with these parts reversed, if preferred, or with any equivalent friction-engaging mechanism.

An exceptional part in this organization is the intermediate pinion 9, engaged by gear 7 and meshing with a small gear or pinion 10 on the hub of gear 6. The gear 6 in turn meshes with a pinion 11 on the hub of gear 5, while the hub of fixed gear 4 on shaft E carries a sprocket-wheel 12, over which runs the sprocket-chain 13 to another wheel 14, fixed on the driven shaft or axle B, thereby completing the power connections to said shaft.

Now considering first the direct power connections and movement, we find the free gear 5 meshing permanently with the power-pinion 8; but all the direct or forward line mechanism beyond gear 5 would stand still if engagement were not made therewith. Hence in order to employ said mechanism I provide a friction-coupling through the friction members $c$ and $d$, which are pressed together by the axial movement of shaft C, through the expansible device H, Fig. 3, one such device being attached to each shaft C, D, and E, but all independent of each other. For convenience this device will be referred to hereinafter as a "bellows," being inflatable and expansible and having its sides bearing against opposite plates 15 and 16. Each shaft is loosely engaged with one of the disks 16, which is provided with an interposed anti-friction or ball-bearing having its backing against a flange or head 17 on the shaft and next to which the disk 16 is confined, while the opposite disk 15 is fixed to a supplemental frame-bar 18 or its equivalent to give it a firm backing when pressure is applied. The sides of the bellows press against these disks when the bellows is expanded through pneumatic or other available fluid-pressure introduced through flexible tube 20. This forces the shaft axially far enough to make the desired friction engagement between the parts $c$ and $d$, when the shaft C is forcibly rotated and power is transmitted thence through gears 3 and 4 and sprocket-chain 13 to the driven shaft or axle B. Meantime the gears 6 and 7 are running idle. If a different rate of speed be wanted, the gear 2 is skipped and gear 3 is thrown into action in like manner exactly as described for gear 2. Then the line of power is through gear 5, pinion 11, gear 6, and gears 3 and 4 onward to the driven shaft. In this case gears 2 and 7 would be left idle. On the other hand, if a reverse movement be desired it is easily and promptly obtained by passing both gears 2 and 3 and operating through gear 4 and its shaft to connect up with gear 7. This would introduce the new factor of the intermediate pinion 9, and although there would be no change of direction of rotation in gears 5 and 6 it would work a reversal on gear 7 and its shaft and gear 4, so that now the driven shaft or axle B would turn in the opposite direction. It will be noticed that all these changes of speed and direction are made through frictional appliances, so that there need be no strain or breakage, nor even abruptness in the movements.

If preferred, a strictly mechanical device may be employed in lieu of the bellows or its equivalent here shown.

It will be noticed that the hubs of the gears 5, 6, and 7 bear against antifriction-balls located against the frame F, so as to afford an easy bearing here when said gears are at work. Any suitable spring may be introduced here or there to throw the friction-surfaces c and d out of engagement, when the axial pressure is relieved. Indeed, I find that in most cases the tendency is so decided to clear at this point that no particular separating mechanism is needed.

In lieu of friction-clutches other clutches may be used, and in lieu of moving the shaft to make clutch engagement either gear on the shaft may be moved toward the other for this purpose. So, also, may there be kindred changes of mechanism and equivalent constructions employed here and there, without departing from the spirit of the invention.

What I claim is—

1. In power-transmitting mechanism, a drive-shaft and a driven shaft and a series of shafts intermediate thereof and parallel thereto, two trains of gears on said intermediate shafts, one of which is fixed to the shafts and the other free, power connections between the drive-shaft and the first of the said free gears and power connections between the last of the said fixed gears and the driven shaft, and means to operatively connect said gears on the several intermediate shafts, substantially as described.

2. The drive-shaft and the driven shaft, a series of intermediate shafts and a set of gears on each intermediate shaft, a clutch between the gears on each shaft and means to throw each clutch separately into engagement, and power connections between said gears and the drive and driven shafts, substantially as described.

3. The drive-shaft and the driven shaft, a set of intermediate shafts and two trains of gears mounted on said intermediate shafts, one of which is fixed to the shafts, and clutch mechanism between the gears on each intermediate shaft, whereby different combinations of said gears are made for the transmission of power, substantially as described.

4. In power-transmitting mechanism, two trains of gears and parallel shafts each having one gear of each train fixed thereon and one of each train free, and clutch mechanism between the fixed and free gears on each shaft, substantially as described.

5. A power-transmitting mechanism comprising a series of parallel shafts, a set of gears on each shaft and the gears on one shaft coöperating with the corresponding gears on the next shaft to transmit the power, one line of said gears being fastened to said shafts and the other line loose thereon, substantially as described.

6. The drive-shaft and the driven shaft, three parallel intermediate shafts, a train of intermeshing free gears and a train of intermeshing fixed gears on said intermediate shafts, and clutches between them, in combination with a pinion on the driver-shaft engaged with said free gears, and power-transmitting connections between the last of said fixed gears and the driven shaft, substantially as described.

7. The means substantially as described for varying the speed of the vehicle, comprising a drive-shaft and a driven shaft, a set of intermediate shafts and two trains of gears thereon in parallel lines, one set free on said shafts and the other fixed thereon, clutch mechanism between the gears on each shaft, there being a pinion rigid with the free gear next to the drive-shaft, and meshing with the free gear on the next adjacent shaft, whereby power is taken through a pinion instead of a gear on the first of said series of shafts and the speed is reduced, substantially as described.

8. In power-transmitting mechanism for motor-vehicles, the drive-shaft and the driven shaft, a series of intermediate shafts, and a series of fixed gears and a series of loose gears thereon and clutches between said gears, in combination with pinions to make connections between said loose gears, and a separately-mounted pinion in the line of said pinions and loose gears, whereby the direction of rotation of the driven shaft is reversed, substantially as described.

Witness my hand to the foregoing specification this 19th day of December, 1899.

ROLLA R. DARLING.

Witnesses:
H. E. MUDRA,
R. B. MOSER.